US010724155B2

(12) United States Patent
Rovellini

(10) Patent No.: US 10,724,155 B2
(45) Date of Patent: Jul. 28, 2020

(54) ADVANCEMENT MEMBER FOR FIBER MATERIAL AND CARBONIZATION FURNACE FOR THE PRODUCTION OF CARBON FIBER

(71) Applicant: M.A.E. S.P.A., Piacenza (PC) (IT)

(72) Inventor: Marco Rovellini, Piacenza (IT)

(73) Assignee: M.A.E. S.P.A., Piacenza (PC) (IT)

( * ) Notice: Subject to any disclaimer, the term of this patent is extended or adjusted under 35 U.S.C. 154(b) by 261 days.

(21) Appl. No.: 15/761,948

(22) PCT Filed: Oct. 14, 2016

(86) PCT No.: PCT/IB2016/056152
§ 371 (c)(1),
(2) Date: Mar. 21, 2018

(87) PCT Pub. No.: WO2017/068470
PCT Pub. Date: Apr. 27, 2017

(65) Prior Publication Data
US 2018/0266019 A1 Sep. 20, 2018

(30) Foreign Application Priority Data
Oct. 20, 2015 (IT) .................. 102015000063374

(51) Int. Cl.
*D01F 9/32* (2006.01)
*B65H 51/32* (2006.01)
(Continued)

(52) U.S. Cl.
CPC .............. *D01F 9/32* (2013.01); *B65H 51/32* (2013.01); *D01D 10/0436* (2013.01);
(Continued)

(58) Field of Classification Search
CPC ........................................................ D01F 9/32
See application file for complete search history.

(56) References Cited

U.S. PATENT DOCUMENTS

| 1,923,183 | A | * | 8/1933 | Blum | .................... C03B 37/022 |
| | | | | | 65/438 |
| 2,035,312 | A | * | 3/1936 | Greer | ....................... C21D 9/62 |
| | | | | | 432/59 |

(Continued)

FOREIGN PATENT DOCUMENTS

| CN | 201034148 Y | 3/2008 |
| CN | 104214277 A | 12/2014 |

(Continued)

OTHER PUBLICATIONS

International Search Report and Written Opinion dated Jan. 12, 2017 for counterpart PCT Application No. PCT/IB2016/056152.

*Primary Examiner* — Nathaniel Herzfeld
(74) *Attorney, Agent, or Firm* — Shuttleworth & Ingersoll, PLC; Timothy Klima

(57) ABSTRACT

An advancement member of a fibre material for a carbonization line for the production of carbon fibres includes a support structure extending between two end sections along a direction of advance of the fibre material, a plurality of feed rollers for the fibre material, each rotatably associated to the support structure by a pair of support elements, wherein the support elements of an inlet roller and/or an outlet roller includes a base integral with said support structure, a support ring coupled with the base and having at least a through opening for receiving one end of the respective feed roller and adjusting means operatively interposed between the base and the ring and configured to move the position of the ring relative to the base along a preferably substantially vertical adjustment direction.

12 Claims, 3 Drawing Sheets

(51) Int. Cl.
*D01D 13/02* (2006.01)
*F16C 35/00* (2006.01)
*F16H 1/00* (2006.01)
*D01D 10/04* (2006.01)
*F16H 1/22* (2006.01)

(52) U.S. Cl.
CPC ............. *D01D 13/02* (2013.01); *F16C 35/00* (2013.01); *F16H 1/00* (2013.01); *F16H 1/22* (2013.01); *D10B 2101/12* (2013.01)

(56) References Cited

U.S. PATENT DOCUMENTS

| | | | | |
|---|---|---|---|---|
| 3,504,954 | A * | 4/1970 | Robson | F16C 35/00 384/252 |
| 3,552,923 | A * | 1/1971 | Carpenter | D01F 9/14 423/447.6 |
| 3,935,301 | A * | 1/1976 | Morita | D01F 9/32 423/447.4 |
| 4,671,950 | A * | 6/1987 | Ogawa | D01F 9/32 264/29.2 |
| 8,007,276 | B2 * | 8/2011 | Melgaard | D01F 9/32 34/643 |
| 2011/0033364 | A1 * | 2/2011 | Samejima | B65H 63/06 423/447.1 |

FOREIGN PATENT DOCUMENTS

| | | |
|---|---|---|
| DE | 19927897 A1 | 12/2000 |
| JP | H082820 A | 1/1996 |
| JP | 2001020140 A | 1/2001 |

* cited by examiner

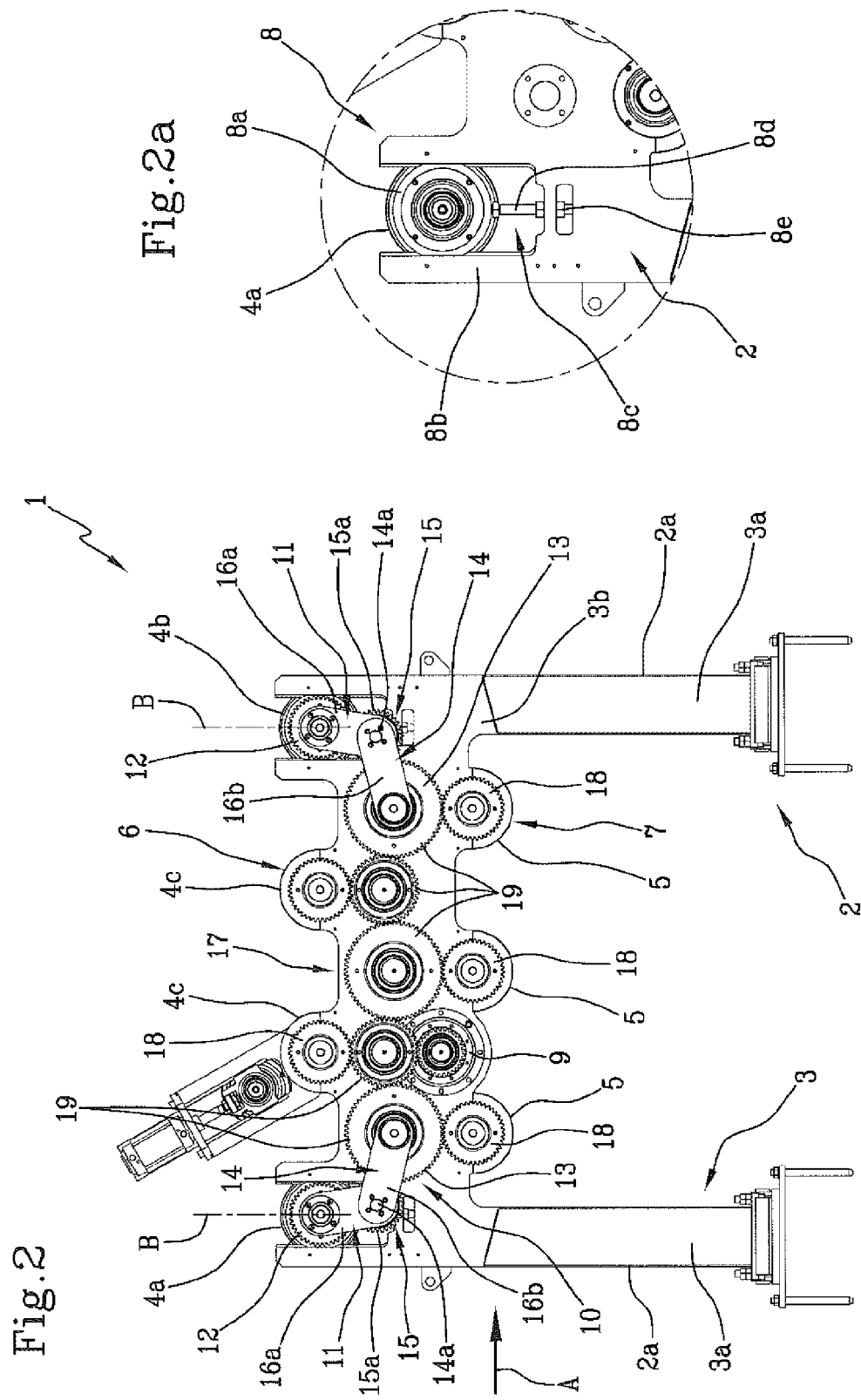

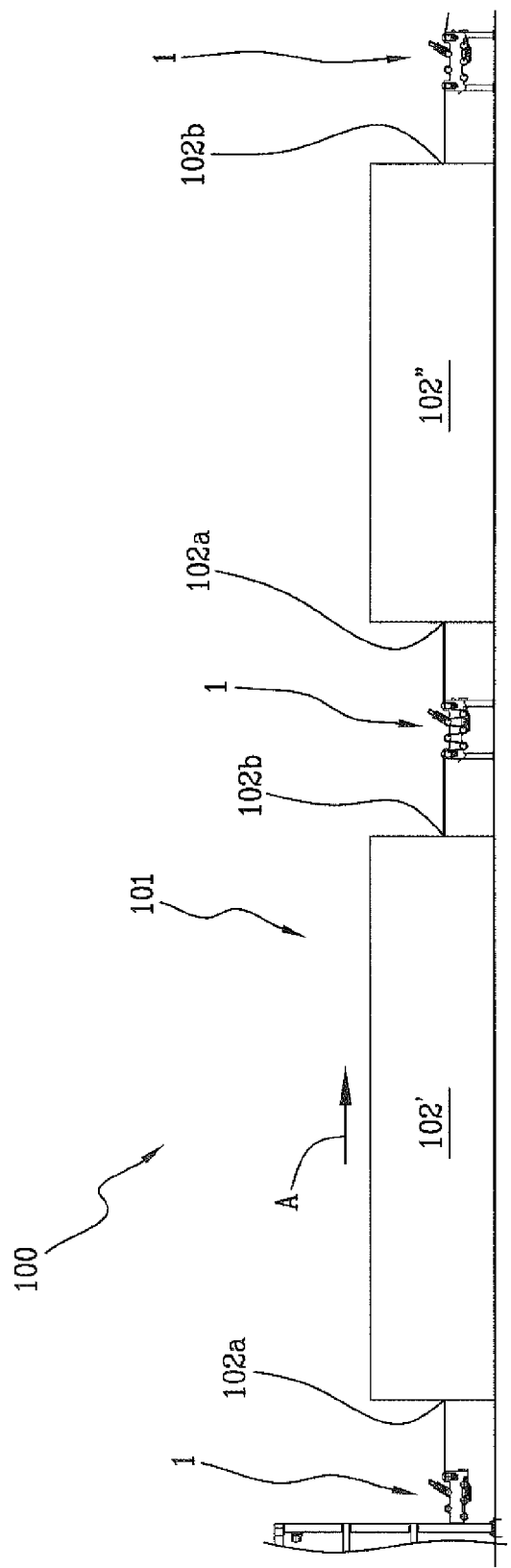

ADVANCEMENT MEMBER FOR FIBER MATERIAL AND CARBONIZATION FURNACE FOR THE PRODUCTION OF CARBON FIBER

This application is the National Phase of International Application PCT/IB2016/056152 filed Oct. 14, 2016 which designated the U.S.

This application claims priority to Italian Patent Application No. 102015000063374 filed Oct. 20, 2015, which application is incorporated by reference herein.

The present invention relates to an advancement member for fibre material and a carbonization furnace for the production of carbon fibres.

The present invention thus finds particular application in the treatment of bundled fibres or fabrics, and preferably in the carbon fibre production from a precursor fibre.

Note that the availability of carbon fibre, as well as the opportunity to treat it, has led to an exponential growth in the use of such composites in many applications, for example in the energy industry, in transports, in civil engineering, in the production of sports equipment, and also in aviation industry.

Currently, carbon fibres are produced by modification of artificial fibres (industrially rayon, experimentally lignin), synthetic fibres (polyacrylonitrile, but also PBO and, experimentally, other thermoplastic fibres), or residues of distillation of oil or tar (pitch). The first carbon fibres are traditionally referred to as carbon fibres derived from PAN, while the second carbon fibres are derived from pitch. Often, the latter type of fibres is improperly referred to as "graphite fibres", although obviously these fibres are not obtained from graphite, to emphasize the fact that when said fibres are subjected to a thermal treatment above 2000° C., they finally have an arrangement of the carbon atoms very similar to the typical arrangement of the graphite and a substantial absence of other elements in the lattice.

Operationally, the carbon fibre production begins with the thermal treatment of a "precursor" or "proto-filament", which is previously oxidized (in special oxidation ovens) and subsequently treated in a carbonization oven; possibly, as a result of carbonization, the fibre can further be finished and treated in baths or surface treatment stations.

The carbonization process, generally conducted in an inert atmosphere, allows the removal of the atoms not belonging to the carbon structure with the development of the final graphitic structure. The carbonization process generally takes place in two stages: a first stage at a low temperature (350-950° C., 400-900° C. in current practice) and a second high temperature stage (1000-1800° C., 1000-1450° C. in current practice).

In certain embodiments, the carbonization oven has an ultra high temperature stage able to bring the graphitization of the material at about 2000° C.

During the carbonization process, the fibre undergoes a transverse shrinkage, which results in a reduction of the diameter due to the loss of about 50% of its initial weight in the case of carbon fibre from PAN and higher for other types of precursor; instead, the corresponding longitudinal shrinkage is almost completely mechanically counteracted, resulting in the development of a greater molecular orientation that contributes to the increase in the final mechanical properties of the carbon fibre.

From a structural point of view, in the carbonization ovens, the temperature of subsequent stations is sequential, typically only applied to a portion of precursor fibre "stretched" between an inlet roller and an output roller.

Each roller is typically part of an advancement member which is more complex than in the prior art and is constituted by a plurality of rollers arranged so as to define a rick-rack fibre feed path, so as to keep it stretched and avoid slipping.

One of the main problems in the design of carbonization ovens lies precisely in realizing the advancement members for feeding fibre into the furnaces and withdraw it.

In fact, given the length of the furnaces and the need to maintain their openings, having a typically rectangular inlet and outlet section, as much as possible limited in height, it is of fundamental importance to define the fibre release height to the openings depending on the type of material, the length of the oven and the temperatures reached.

These variables in fact influence the curvature of the chain (that is the profile of the fibre between the two advancement members), and therefore the furnace inlet height and outlet height, and the definition of the position and of the withdrawal and release height of rollers becomes critical.

Moreover, the ability of the manufacturer to change the process parameters of the furnace as well as the type and strain of the treated fibre makes line setting a complex and very (time) consuming task.

The object of the present invention is therefore to overcome the drawbacks of the above-mentioned prior art.

In particular, an object of the present invention is to provide a highly versatile, easy to set advancement member for fibre material for a carbonization line for the production of carbon fibres.

In particular, an object of the present invention is to provide an advancement member for fibre material for a carbonization line for the production of carbon fibres which ensures the highest ease of advancement of the fibre, limiting slipping and friction.

Said aims are achieved by an advancement member for fibre material for a carbonization line for the production of carbon fibres having features as disclosed herein, as well as by a carbonization oven according to the present disclosure.

In particular, such an advancement member comprises a support structure extending between two end sections along a direction of advance of the fibre material, a plurality of feed rollers for the fibre material, each rotatably associated to the support structure by a pair of support elements, and arranged parallel to each other in cascade.

The plurality of rollers comprises a first and a second array of rollers defining a serpentine feed path for the fibre material and comprising an inlet roller and an outlet roller (4b); according to a first aspect of the present invention, the support elements of the inlet and/or the outlet roller comprise a base integral with said support structure, a support ring coupled with said base and having at least a through opening for receiving one end of said feed roller, and adjusting means operatively interposed between said base and said ring, configured to move the position of the ring relative to the base along a preferably substantially vertical adjustment direction.

Advantageously, in this way it is possible to set the fibre reception or release height quickly and efficiently, thereby increasing the versatility and productivity of the line.

Furthermore, according to a further aspect of the present invention, the inlet roller and the outlet roller are motorized in order to ensure maximum "traction" on the fibre, reducing friction and slipping.

In this respect, there are at least one motor, at least a transmission assembly, operatively interposed between said motor, and at least said inlet and outlet rollers.

Preferably, the transmission unit comprises at least one adjustable portion coupled to said inlet roller and/or said outlet roller, configured to track the position of the roller along said adjustment direction, keeping it coupled with said motor.

Advantageously, in this way, it is possible to maintain the constant coupling between the motor and the rollers, by limiting the intervention of the operator to the adjustment of the position of the support element.

These and further features, as well as the respective advantages, will become more apparent from the following exemplary, and therefore not limiting, description of a preferred, therefore not exclusive, embodiment of an advancement member for fibre material for a carbonization line for the production of carbon fibre as illustrated in the attached drawings, wherein:

FIG. 2 shows a side view of the advancement member of FIG. 1;

FIG. 2a shows a side view of a detail of FIG. 2 with some parts removed in order to highlight the others;

FIG. 3 is a schematic view of a carbonization oven according to the present invention.

Figure 1:
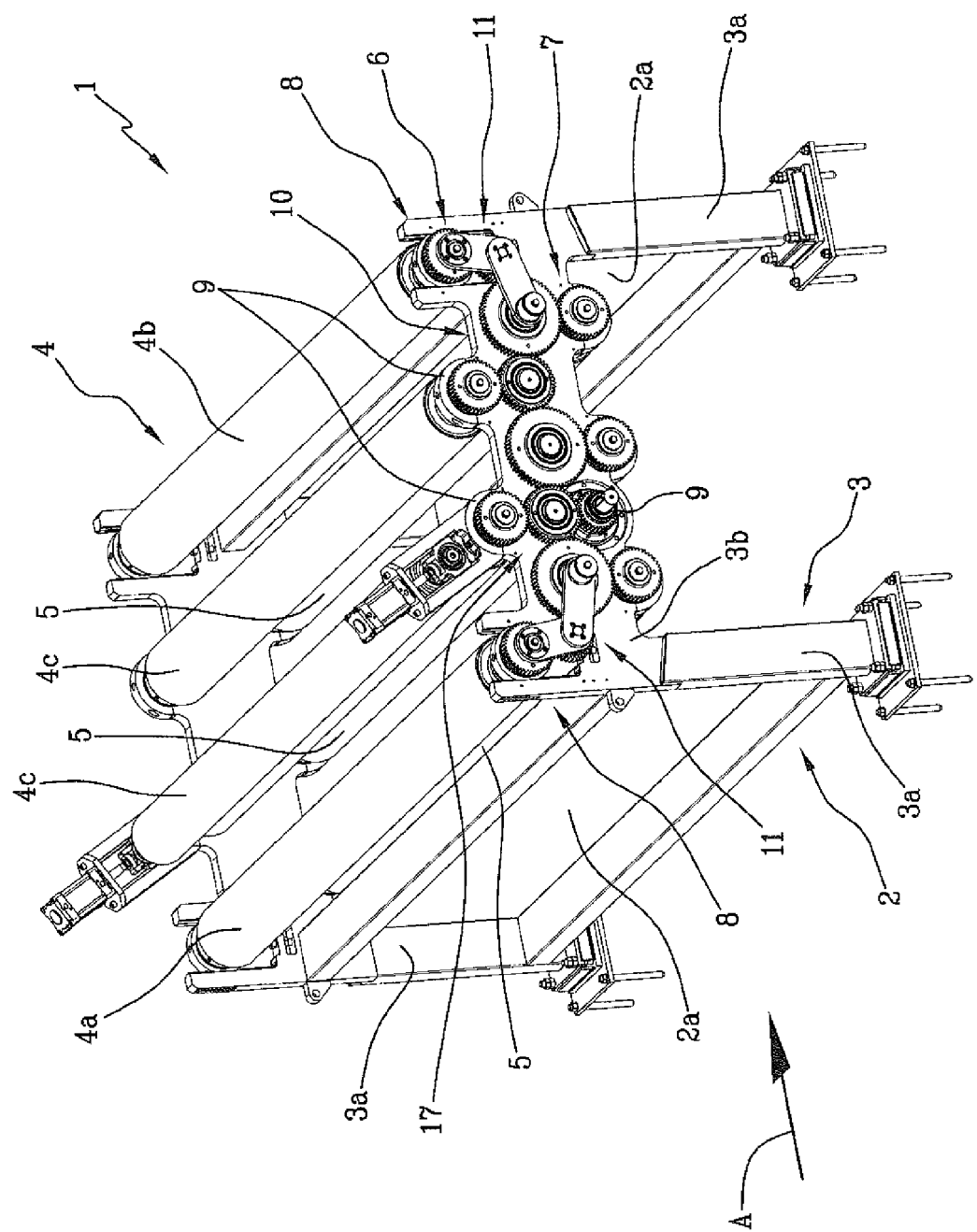
FIG. 1 shows a perspective view of an advancement member for fibre material according to the present invention.

With reference to the attached figures, number 1 indicates an advancement member for fibre material for a carbonization line 100 for the production of carbon fibres.

The carbonization line is part of a plant for the production of carbon fibre, i.e. A plant typically comprising a first line, or oxidation line, and a second line, subsequent to the first, i.e. the carbonization line 100.

The carbonization line 100 comprises one or more carbonization ovens 101.

In the illustrated embodiment, the carbonization ovens are two arranged in series; more precisely, the carbonization line 100 comprises at least a low-temperature oven 102' and a high-temperature oven 102".

Each carbonization oven 101 comprises at least one furnace 102 which operates at least at a predetermined temperature and extending along a direction of advance "A" of the fibre material.

More precisely, the furnace 102 develops like a substantially box-shaped (or closed) body between an inlet 102a of the fibre material and an outlet 102b of the fibre material.

These inlet and outlet 102a, 102b preferably have an oblong shape (rectangular, substantially horizontal) with vertical extension limited as much as possible without coming into contact with the fibre in order to reduce the dispersion of toxic fumes in the environment.

In certain embodiments, the inlet and the outlet are adjustable and/or movable in position by means of sliding bulkheads (not shown) in order to allow an optimization of the positioning of the inlet and outlet 102a, 102b as a function of the height and "attachment" angle of the fibre material.

Upstream and downstream of the furnace 102, there are respective advancement members 1 in accordance with the present invention.

More precisely, a first advancement member 1 is facing the inlet 102a for feeding the fibre material to the furnace 102, while a second advancement member 102b faces the outlet 102b, operationally downstream of the same, to withdraw the fibre material and send it to a furnace or to a subsequent station.

Each advancement member 1 comprises a support structure 2 extending between two end sections 2a along a direction of advance "A" of the fibre material.

Therefore, the support structure 2 has a base 3, preferably equipped with a plurality of ground support portions 3a, or feet.

In the preferred embodiment, the support portions 3a are four, coupled two by two by cross members to stiffen the structure 2.

The advancement member 1 also comprises a plurality of feed rollers 4, 5 for the fibre material.

These rollers 4, 5 are rotatably associated to the support structure 2.

Preferably, the rollers 4, 5 are associated to a portion 3b of the base 3 distal from the support portions 3a.

In other words, the rollers 4, 5 are pivoted to an upper portion 3b (or back) of the base 3.

These rollers 4, 5 are arranged parallel to each other in cascade, or in a sequence that defines a preferably rick-rack or serpentine feed path of the fibre material partially wound around them.

Preferably, the rollers 4, 5 are arranged on a first array 6 and a second array 7.

Such arrays 6, 7 define a serpentine feed path for the fibre material and comprise an inlet roller 4a and an outlet roller 4b.

Preferably, for ease of description, the rollers of the first array 6 are defined as first rollers 4 and the rollers of the second array 7 are defined as second rollers 5.

The arrays can assume a distinct conformation, extending both horizontally and vertically, both with an even or odd number of rollers.

In the illustrated (preferred) embodiment, the arrays 6, 7 extend along said direction of advance "A" with the rollers 4, 5 arranged in succession.

More precisely, the first array 6 of rollers has a plurality of rollers arranged in a row at a first height and comprises said inlet roller 4a and said outlet roller 4b.

The second array 7 of rollers has a plurality of rollers arranged in a row to a second height, higher or lower than said first height, and having a number of rollers 5 which is less than the number of rollers 4 of the first array 6, interposed, with reference to said direction of advance "A", between said inlet rollers 4a and said outlet rollers 4b.

Therefore, in this embodiment, the first array 6 is a first row and the second array 7 is a second row.

In the preferred embodiment, the first array 6 is located at a height which is higher than the second array 7.

Furthermore, the number of rollers 6 of the first array (or row) is equal to the number of rollers of the second array 7 (or row) plus one unit.

In particular, the second array 7 of rollers comprises three rollers 5 pivoted to the support structure 2 (preferably with fixed position), while the first array 6 comprises two median rollers 4c, pivoted to the support structure 2 (also preferably with position fixed), and two end rollers movable with respect to the support structure 2 and defining the inlet roller 4a and the outlet roller 4b.

Alternatively, other embodiments are possible, for example with the two arrays facing and developing in vertical coils, wherein the inlet and outlet rollers are each part of a respective array, placed in the upper or lower area.

Preferably, each roller 4 is rotatably coupled to the structure 2 (in particular to the upper portion 3b) by means of a pair of support elements 8.

According to one aspect of the present invention, the support elements 8 of the inlet roller 4a and/or of the outlet roller 4b comprise a base 8a integral with the support structure 2 and a ring 8b coupled with the base 8a and having at least one through opening for receiving one end of the respective feed roller 4a, 4b.

These support elements 8 also comprise adjusting means 8c operatively interposed between the base 8a and the ring 8b, and configured to move the position of the ring 8b relative to the base 8a along a preferably substantially vertical adjustment direction "B".

Preferably, the adjusting means 8c are accessible mechanically and/or electronically from the outside of the support element 8 in order to allow an in line adjustment of the position of the ring 8b.

Advantageously, in this way, it is possible to adapt the height of the inlet roller 4a and/or the outlet roller 4b according to the height of the inlet/outlet of the furnace 102, of the temperature inside the furnace 102 and of the type of fibre material.

Preferably, the adjusting means 8c are of the screw type.

More precisely, the adjusting means 8c comprise at least one screw 8d extending along the respective adjustment direction "B" and rotatably coupled (by means of a threaded coupling), respectively to the ring 8b for moving it relative to the base 8a.

In the illustrated embodiment, the adjusting means 8c can be operated manually; preferably, each screw is engaged with an actuation nut, selectively usable by the operator for rotating the screw integral with the ring (therefore moving the ring).

Alternatively, however, solutions in which the adjustment means are automated and/or of other nature (e.g., electric motors, linear actuators, spiral pairs, rack and pinion, or other types of known or unknown connections) are also comprised in the spirit of the present invention.

Preferably, moreover, the adjusting means 8c are provided with at least one locking member 8e configured to constrain the position of the ring 8b with respect to the base 8a, once identified, by the operator, as the optimal one.

According to a further aspect (additional or optional to the previous) of the present invention, the inlet roller 4a and the outlet roller 4b of the advancement member 1 are motorized.

Advantageously, having both motorized and adjustable inlet rollers 4a and outlet rollers 4b in line, it is possible to combine maximum versatility of the advancement member with enhanced performance in terms of gripping and tension of the fibres.

Particularly, the advancement member 1 comprises at least one motor 9 and a transmission assembly 10 operatively interposed between said motor 9, and at least said inlet roller 4a and said outlet roller 4b.

Preferably, the transmission assembly 10 comprises a plurality of toothed wheels 12, 13, 15, 18 rotatably coupled to each other to confer to said plurality of rollers 4, 5 a same rotation speed.

More preferably, each roller is constrained to a toothed wheel 12, 13, 15, 18; at least one transfer gear 19 is placed between each of these toothed wheels 12, 13, 15, 18.

For simplicity of construction, the motion transfer gears 19 are interposed between each toothed wheel and the next wheel are at least two.

In any case, preferably, the whole transmission assembly 10 extends substantially in a same vertical plane and is secured to a side of the support structure 2.

Note that the transmission assembly 10 comprises at least one adjustable portion 11 and a fixed portion 17 connected to the support structure 2.

The adjustable portion 11 is coupled to the inlet roller 4a and/or 4b to the outlet roller configured to track the position of the roller 4a, 4b (or ring 8b of the adjusting means 8) along said adjustment direction "B" by keeping it coupled with the motor 9.

The fixed portion 17 is coupled to the adjustable portion 11 itself and to the rollers 4, 5, having a fixed position on the support structure 2.

In the illustrated embodiment, the transmission assembly 10 is operatively interposed between the motor 9 and each of the rollers of the first array 6 and of the second array 7.

Therefore, preferably, the adjustable portion 11 coupled to the inlet roller 4a and/or 4b to the outlet roller is configured to track the position of the roller 4a, 4b (i.e. the ring 8b of the adjusting means 8) along said adjustment direction "B" by keeping it coupled with the other rollers 4, 5 of the first array 6 and of the second array 7.

Advantageously, in this way, with a single motor it is possible to drive all of the rollers 4, 5, both those in a fixed position and the adjustable ones (i.e. Inlet roller 4a and outlet roller 4b).

Preferably, the transmission assembly 10 comprises two adjustable portions 11, one associated to the inlet roller 4a and one associated to the outlet roller 4b.

This adjustable portion 11 comprises at least a first toothed wheel 12 coupled with said motor 9, a second toothed wheel 13 rotating integrally with the respective adjustable roller (inlet roller 4a or outlet roller 4b) and at least one connecting arm 14 between said first toothed wheel 12 and said second toothed wheel 13.

More precisely, the adjustable portion 11 also comprises a transfer element 15 interposed between the first wheel 12 and the second wheel 13, and configured so as to remain coupled thereto at any position of the inlet roller 4a or outlet roller 4b along the adjustment direction "B".

In the preferred embodiment, the transfer element 15 comprises a third toothed wheel 15a coupled with the first toothed wheel 12 and with the second toothed wheel 13, and having a center of rotation defining an articulation pin 14a of said arm 14.

Said arm 14 is thus an articulated arm pivoted in said first toothed wheel 12 and said second toothed wheel 13 and has an articulation pin 14a pivoted in said third toothed wheel 15.

In other words, the arm 14 has a first lever 16a extending between the centers of rotation of the first toothed wheel 12 and the third toothed wheel 15 and pivoted thereto and a second lever 16b extending between the centers of rotation of the second toothed wheel 13 and the third toothed wheel 15 and pivoted to them.

Consequently, the adjustable portion 11 of the transmission assembly 10 defines a "horse-head" structure.

Advantageously, in this way, irrespective of the positioning ring 8b along the adjustment direction "B", the respective inlet roller 4a or outlet roller 4b remains coupled to the transmission assembly 10 and thus motorized.

In alternative embodiments, the transmission assembly is absent and each roller is associated to a respective motor or gear motor.

A further alternative, always in the spirit of the present invention, involves the use of a single fixed transmission assembly associated to the rollers with given position and a pair of gear motors, each associated directly to the inlet roller or to the outlet roller.

The invention achieves the intended objects and achieves important advantages.

In fact, the use of support elements adjustable in height for the inlet and outlet rollers of the advancement member allows maximum flexibility in setting and adapting the organ to the specific working conditions of the moment.

Furthermore, the motorization of such inlet and outlet rollers, together with their adjustability, allows to combine high performance in terms of gripping and tension of the fibre material with the flexibility and productivity of the plant.

Moreover, the adoption of a horse-head transmission system for adjustable-position rollers allows to have a single motorization for the entire advancement member.

The invention claimed is:

1. An advancement member of a fiber material for a carbonization line for the production of carbon fibers, comprising:
  a support structure extending between two end sections along a direction of advance of the fiber material;
  a plurality of feed rollers for the fiber material each rotatably associated to the support structure by a pair of support elements and arranged parallel to each other in cascade; the plurality of feed rollers comprising a first and a second arrays of feed rollers defining a serpentine feed path for the fiber material, and comprising an inlet roller and an outlet roller;
  a motor and a transmission assembly operatively interposed between the motor and at least the inlet roller and the outlet roller,
  wherein the support elements of at least one chosen from the inlet roller and the outlet roller comprise:
  a base integral with the support structure,
  a support ring coupled with the base and including a through opening for receiving one end of the at least one chosen from the inlet roller and the outlet roller,
  an adjusting device operatively interposed between the base and the suppor ring, and configured to move a position of the support ring relative to the base along a vertical adjustment direction, and
  wherein the transmission assembly comprises an adjustable portion coupled with the at least one chosen from the inlet roller and the outlet roller; the adjustable portion being configured to chase a position of the at least one chosen from the inlet roller and the outlet roller, along the adjustment direction, while maintaining the at least one chosen from the inlet roller and the outlet roller coupled with at least one chosen from the motor and with other feed rollers of the first and second arrays of feed rollers.

2. The advancement member according to claim 1, wherein the inlet roller and the outlet roller are motorized.

3. The advancement member according to claim 1, wherein the transmission assembly is operatively interposed between the motor and each of the feed rollers of the first and second arrays of feed rollers.

4. The advancement member according to claim 1, wherein the adjustable portion of the transmission assembly comprises first toothed wheel coupled with the motor, a second toothed wheel coupled with the at least one chosen from the inlet roller and the outlet roller, and a connecting arm between the first and second toothed wheels.

5. The advancement member according to claim 4, wherein the adjustable portion comprises a transfer element interposed between the first and second toothed wheels, and configured so as to remain coupled to the first and second toothed wheels at any position of the at least one chosen from the inlet roller and the outlet roller along the adjustment direction.

6. The advancement member according to claim 5, wherein the transfer element comprises a third toothed wheel coupled with the first and second toothed wheels, and having a center of rotation defining an articulation pin of the connecting arm.

7. The advancement member according to claim 1, wherein the transmission assembly comprises a fixed portion connected to the support structure coupled with the adjustable portion.

8. The advancement member according to claim 1, wherein the first array of feed rollers includes a plurality of feed rollers arranged in a row at a first height, and comprises the inlet roller and the outlet roller; the second array of feed rollers includes a plurality of feed rollers arranged in a row at a second height, higher or lower than the first height, and having a number of feed rollers less than a number of feed rollers of the first array interposed, with respect to the direction of advance, between said inlet and outlet rollers.

9. The advancement member according to claim 1, wherein:
  the second array of feed rollers comprises three rollers pivoted to the support structure, and;
  the first array of feed rollers comprises two median rollers, pivoted to the supporting structure, and two end rollers movable relative to the support structure and defining the inlet roller and the outlet roller.

10. A carbonization furnace for the production of carbon fiber, comprising:
  first and second advancement members according to claim 1;
  wherein the second advancement member is operatively arranged downstream of the first advancement member and spaced from the first advancement member along the direction of advance;
  a furnace interposed between the first and second advancement members, the furnace including:
  an inlet facing the outlet roller of the first advancement member, and
  an outlet facing the inlet roller of the second advancement member.

11. The advancement member according to claim 1, wherein the adjustment device includes a threaded member engaging a further threaded portion to move the position of the support ring.

12. The advancement member according to claim 4, wherein the adjustment device includes a threaded member engaging a further threaded portion to move the position of the support ring.

* * * * *